United States Patent [19]

Dobesh

[11] Patent Number: 4,481,805
[45] Date of Patent: Nov. 13, 1984

[54] METER PROVER APPARATUS AND METHOD

[75] Inventor: Eugene L. Dobesh, Houston, Tex.

[73] Assignee: F. H. Maloney Company, Houston, Tex.

[21] Appl. No.: 289,241

[22] Filed: Jun. 3, 1981

[51] Int. Cl.³ ............................................. G01F 25/00
[52] U.S. Cl. ........................................................ 73/3
[58] Field of Search ............................................. 73/3

[56] References Cited

U.S. PATENT DOCUMENTS

| 3,492,856 | 2/1970 | Francisco | 73/3 |
| 3,877,287 | 4/1975 | Duntz | 73/3 |
| 3,933,027 | 1/1976 | Mehall | 73/3 |
| 3,937,048 | 2/1976 | St. Clair | 73/3 |
| 4,152,922 | 5/1979 | Francisco | 73/3 |
| 4,324,127 | 4/1982 | Gazzara | 73/3 |
| 4,347,731 | 9/1982 | Fisher | 73/3 |

Primary Examiner—S. Clement Swisher

Attorney, Agent, or Firm—David Alan Rose; Ned L. Conley; David S. Wise

[57] ABSTRACT

According to the invention, fluid is adapted to flow through a piston and cylinder disposed in the housing of a meter prover. The cylinder is telescopingly received within the piston. The fluid is permitted to flow into the piston and cylinder through an upstream inlet and leave through exit ports in the cylinder. A poppet valve is provided for closing the exit ports whereupon the piston becomes a fluid barrier and is adapted to move in synchrony with the fluid flow from the upstream fluid inlet. A single detector is provided which is activated at the start of the proving run and at the end of the proving run. A rack is mounted on the piston for turning a gear. The gear rotates a disc having a plurality of markings indicating the incremental displacement of the piston. A photopulser transmits a pulse to a counter for each marking detected upon rotation of the disc. Sufficient piston displacement is permitted to generate a minimum of 10,000 pulses. The counter does not start counting pulses until a meter pulse is generated by the counter of the flowmeter.

57 Claims, 7 Drawing Figures

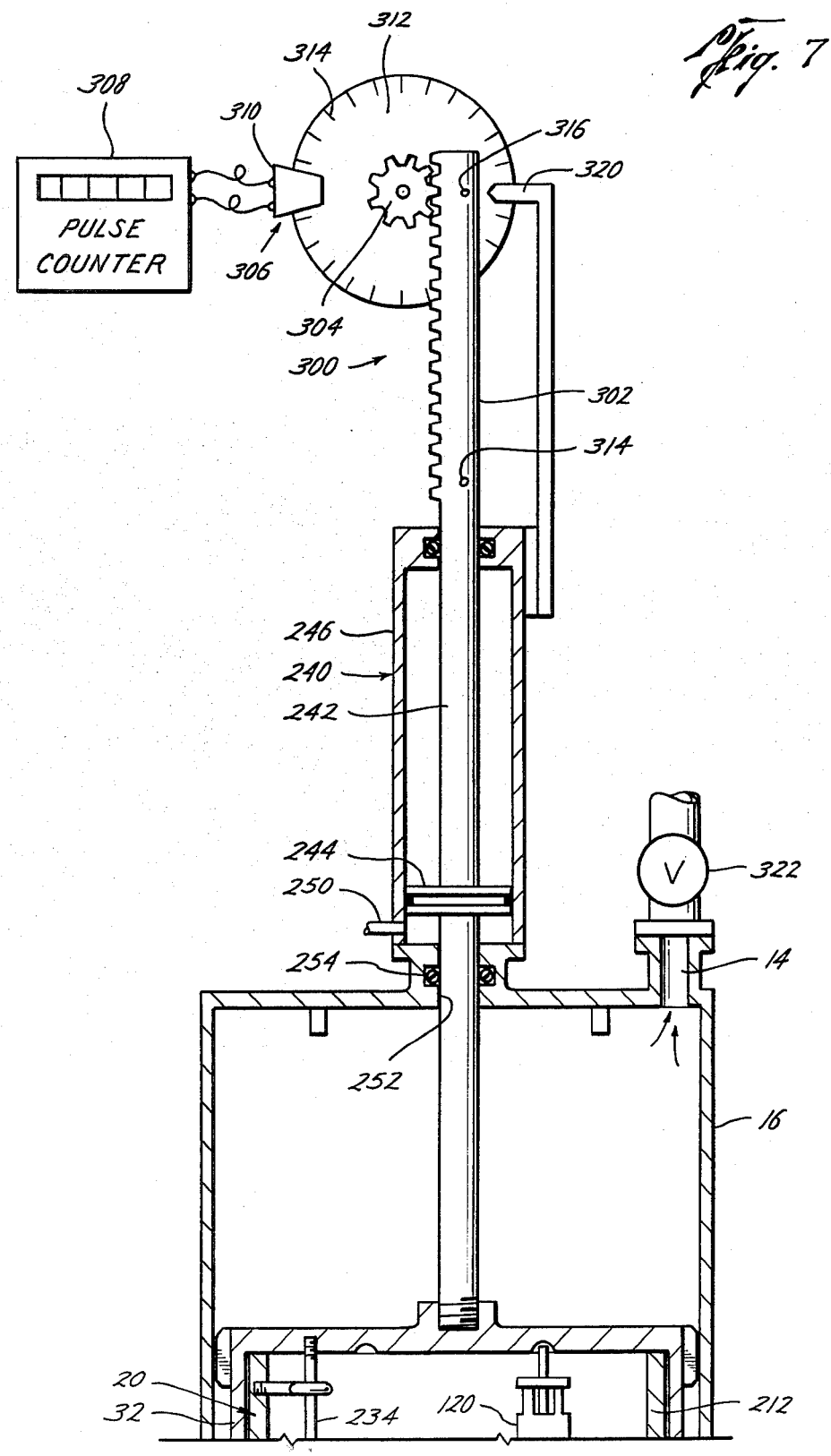

METER PROVER APPARATUS AND METHOD

BACKGROUND OF THE ART

This invention relates to the testing, calibrating and proving of flowmeters and more particularly relates to improvements in small volume "ballistic type" meter provers for the testing of flowmeters.

Conventional flowmetering devices of the positive displacement or turbine types are used in the installation and operation of fluid transmission systems for the handling of various liquids. Because flowmeters are subject to serious inaccuracies which may be cumulative, it is common to use meter provers to make accurate periodic checks of the flow for calibration of the flowmeter. To maintain accurate readings from a flowmeter, it therefore must be calibrated from time to time to determine its K-factor, i.e., the constant of proportionality between the flow rate of the fluid flowing through the flow meter and the response given by the flowmeter.

In the case of a turbine type flowmeter, electrical pulses are developed by the flowmeter which are proportional in number to the volume of fluid flow through the flowmeter. The K-factor is expressed in terms of the number of pulses generated by the flowmeter per unit volume of fluid passing through the flowmeter, and is a function of the type of fluid, as well as the fluid temperature, pressure, and flow rate, and varies as the parts of the flowmeter wear in the course of use.

API Standard 2531 establishes the tests for certification of a flowmeter. Such certification is required when custody transfers of fluids are made. The API code requires a discrimination of one part in ten thousand, i.e., there is an uncertainty of plus or minus one pulse in a total of 10,000 meter pulses generated by the flowmeter per volume of liquid displaced. This achieves an accuracy of one part in 10,000. Further, five meter prover runs are normally required with a repeatability of 0.02% between the runs.

One type of conventional meter prover involves propelling a solid body, such as a spherical resilient plug, through a given section of a conduit arranged in series with the flowmeter to be proved. The conduit is provided with a detection means for indicating when the plug moves past an initial position and a final position. The volume of the conduit and therefore the fluid displacement between these positions is carefully calibrated. By recording the volume of fluid flowing through the flowmeter during the time it takes the plug to flow the distance between the two positions, the flowmeter reading may be checked against the known conduit volume. Such meter provers are disclosed in U.S. Pat. Nos. 2,772,561; 3,021,703; 3,397,570; and 3,738,153.

The initial concept of apparatus for calibrating flowmeters as disclosed in U.S. Pat. Nos. 2,772,561; 3,021,703; and 3,397,570, for example, depends entirely on pulses from the flowmeters for discrimination in measuring discrete units of volume. To obtain the meter calibration accuracy possible with the use of such equipment, the accumulation of 10,000 or more pulses from the meter during a single proving run became standard, and was adopted by the American Petroleum Institute as one of the criteria for meter prover design in the API 2531 "USA Standard for Mechanical Displacement Meter Provers." A volume of 0.5% of the maximum hourly flow rate of the meter being proved was also adopted as a suggested volume between detectors for the design of the meter prover, and consideration was given to the resolution of the detectors in the prover design. A system repeatability of 0.02%, the discrimination of the electronic counter which counted the pulses generated by the meter, and a maximum velocity of the prover displacer of 10 feet per second were all suggested targets for the design of meter proving systems in the API 2531 code.

Plug-type meter provers have received widespread use because the meter prover can be made as long as necessary to permit a sufficiently large displacement volume for the flow meter to emit 10,000 meter pulses as required by the API code. However, requiring the meter prover to be large enough to handle such a displacement volume dictates that the meter prover be very bulky and stationary. Emphasis by the trade is now being placed on a smaller and more portable meter prover.

The new API "Manual of Petroleum Measurement Standards, Chapter 4," which supersedes the API 2531, no longer places a restriction on minimum volume between detectors or displacer velocity, which has assisted in the acceptance of small, compact, low volume displacement, high speed meter prover designs. These provers have become known by the generic name of "ballistic" provers. This name originated with the ballistic calibrator patented by E. E. Francisco, Jr., U.S. Pat. No. 3,403,544 and marketed by Flow Technology, Inc. The term "ballistic" prover is now commonly used to describe small, low volume displacement meter provers. With the removal of volume and displacer velocity restrictions in the current code, the basic targets for design of meter proving equipment remaining are a 0.02% system repeatability, 10,000 or more pulses per proving run, and detector resolution. Since the volume defined by the meter prover detector (or pair of detectors in conventional meter proving equipment) can be calibrated to a volume repeatably within 0.02%, and the meter delivers 10,000 pulses (representing 10,000 discrete units of volume) during a proving run, the performance of the meter is measured to two parts in 10,000.

The ballistic meter prover employs a piston that travels in a cylinder in synchrony with the fluid traveling through the flowmeter. By measuring the time interval required for the piston to travel a given distance through the cylinder, an average flow reading can be calculated and compared to the pulses of the flowmeter. This comparison is then used to determine the K-factor.

A typical ballistic meter prover is disclosed in U.S. Pat. No. 4,152,922. The prover includes a measuring cylinder having an inlet and an outlet at its ends connected in a fluid system in series with a flowmeter. A piston, having a passage therethrough, is adapted to travel through the cylinder as a fluid barrier when a poppet valve on the inlet side of the piston closes the passage through the piston. A hydraulic actuator rod is connected to the poppet valve and piston for actuating the poppet valve and retracting the piston within the measuring cylinder. Detectors are mounted on the actuator cylinder of the actuator rod to define the volume displacement of the piston. During a prover run, control circuitry actuates the actuator rod to close the poppet valve in the piston. Fluid pressure at the inlet of the cylinder causes the piston to travel through the measuring cylinder, and the actuator rod, affixed to the piston, actuates the detectors as the rod passes through the actuator cylinder.

Various features of ballistic provers are shown in U.S. Pat. Nos. 3,273,375; 3,403,544; 3,492,856; and 4,152,922, in Waugh Controls Corporation Bulletin PB700.1 entitled "Model 700 MicroProver," and in an article entitled "Inline Liquid Flow Prover" by Richard E. Zimmermann of Flow Technology, Inc. The '375, '544, '856, and '922 patents and the Waugh publication disclose a meter prover having a main cylinder with an inlet and outlet connected in series with a flowmeter in a fluid line. The piston is shown sealing with the main cylinder as it passes through the cylinder during the proving run in the '544, '856, and '922 patents and Waugh publication. The '922 patent discloses a lip seal disposed around the periphery of the piston upstream of the 0 ring seal. The '856 and '922 patents disclose a valve within the piston, and the '922 patent shows the use of O rings between the poppet valve and piston for sealing. A hydraulic piston return is shown in the '922 patent and Waugh publication, and as discussed previously, the '922 patent shows a hydraulically actuated poppet valve. The '922 and '375 patents show piston spacers or stops at each end of the cylinder. Other spacers are shown in the '544 and '856 patents and the Waugh publication.

The Waugh publication discloses a leak detector for the piston seals. Two seals are disposed around the piston, separated by a small circumferential chamber. There is a passageway through the piston to a flexible tube which extends to the downstream end of the cylinder where the tube is connected to a solenoid valve and a pressure switch which is designed to fire on rising pressure. The solenoid valve dumps the pressure between the piston seals to atmospheric (or to a pressure lower than that in the operating prover) and the valve closes. Any seal leakage will increase the pressure in the conduit containing the pressure switch and blocked by the closed solenoid valve, causing an increase in pressure and a corresponding leak indication by the pressure switch. The Waugh publication also discloses a double block and bleed ball-type bypass valve having both upstream and downstream seals with a bleed port leading to the space between the seals. The valve is connected to a solenoid valve and pressure switch as described for the piston seals to warn of any seal leakage past the valve.

The prior art shows the use of multiple detectors. The '375, '544, and '856 patents and the Waugh publication show multiple detectors mounted on the main cylinder. The detector on the Waugh publication is magnetic, and the detector in the '375 patent is pressure actuated.

Other patents show the detectors associated with the hydraulic actuator system for the piston. The '922 patent discloses multiple detectors mounted on the actuator cylinder. The '856 patent discloses the piston rod extending outside the cylinder and attached to a detection system.

U.S. Pat. No. 3,830,092 discloses a leak detection system for a sphere-type meter prover. Two oppositely faced cup-shaped sealing members are secured back to back for sealing engagement with an inner cylindrical surface of a sleeve. The rims of the cup-shaped sealing members contact the cylindrical surface to form an annulus. The flexing of the rims of the sealing members causes the pressure inside the annulus between the sealing members to be substantially less than the adjacent fluid pressure. A pressure monitoring system is connected to the annulus to register this difference in pressures. So long as a pressure differential is indicated, there is no leakage through the sleeve.

Ballistic meter provers are, in general, smaller and more portable than conventional sphere-type meter provers. Most ballistic meter provers are too small to have a sufficient fluid capacity for a volume displacement between detectors which will permit 10,000 pulses from the flowmeter during the prover run. Efforts are being made to adopt a chronometry system where an oscillator is connected to the flowmeter to generate hundreds of oscillations per flowmeter pulse. Although the API code does not sanction the chronometry system, many customers, who do not require certification, are utilizing such a system.

A double chronometry system is disclosed in the Zimmermann article and in the '544 patent. As discussed in the Zimmermann article, for example, as the piston passes through the first and second detector, pulses from a 100 kilohertz oscillator are counted to determine the time of travel of the piston over a given displacement volume. This establishes the rate of flow. As the piston passes the first detector, a second counter also begins counting the same oscillator pulses. This counter does not stop when the second detector is passed, but keeps counting until the next flowmeter pulse has been completed. Since the oscillator frequency is many times higher than the flowmeter pulse frequency, the time interval between the whole pulses of the flowmeter precisely determines the flowmeter frequency. The K-factor is then determined by multiplying the ratio of the flowmeter pulse count over the displacement volume times the ratio of the first oscillator pulse count over the second oscillator pulse count times 60. The ratio of the first oscillator to second oscillator compensates for the fraction of a meter pulse which would introduce an error in a conventional prover.

A bell prover is another type of prover used for gas meters. Such a prover is discussed in an article published in the August 1970 issue of *Pipeline and Gas Journal* entitled "Proving Large Capacity Meters to Meet High Accuracy Demands" by David F. Kee. A bell prover includes an outer tank and an inner cylindrical dry well forming an annulus therebetween. The annulus is filled with a fluid medium such as oil. The bell is suspended so as to be telescopingly received by the annulus between the tank and dry well. Gas is introduced into the dry well causing the bell to move upwardly. The increased gas volume is then measured by a scale against the upward rise of the bell. This provides a convenient and accurate linear displacement analog of the newly delivered volumetric quantity of gas.

The prior art uses multiple detectors in their meter provers. However, because one detector may drift so that it will not trip at exactly the same point through repeated meter prover runs, a true calibrated volume may not be maintained between the detectors, thereby introducing error into the calibration run. Many meter provers have doubled up on the number of detectors and use four detectors. This is redundant and increases the complexities of the system.

In the use of a plurality of detectors, if one detector has to be removed, repaired, or changed, the displacement volume has to be recalibrated. Such a recalibration requires that the prover be drained of fluid, cleaned, and then recalibrated using certified containers for water drawing. This may be very tedious task because it frequently has to be done in the field, such as at offshore rigs, or for large stationary provers at pipeline stations or refineries.

The ballistic provers of the prior art are unidirectional provers. The piston moves in only one direction for a prover run and then must be returned for another run, i.e., the provers do not displace in both directions as bidirectional sphere provers do.

For large turbine meters, and meters of low resolution (pulse output), a considerable amount of volume is displaced by the meter during the generation of 10,000 pulses. For example, a typical 12-inch turbine meter generates 250 pulses per barrel throughput; therefore, in order to generate 10,000 pulses during a proving run, the prover detector or detectors must define a minimum volume of 40 barrels.

Most turbine meters in use today use a variable reluctancetype pickup coil mounted on the meter to detect rotational movement (angular velocity) of the bladed rotor. The coil does not intrude into the flowing stream, and a voltage is generated by the coil assembly as each blade of the turbine passes through the coil's magnetic field. Some meters use a shroud around the turbine blades which is perforated, or in which magnetic "buttons" are installed so as to increase the number of voltage pulses generated per rotation of the turbine blade. There is a practical limit to the spacing of the reluctance slots or magnetic buttons to allow the focusing of magnetic flux and the generation of sufficient voltage to be sensed by the meter's associated electronic counter. These systems are very efficient, as the turbine assembly is designed to "float" during normal operation, and the slight magnetic drag of the reluctance pickup is minimal and consistent. These meters are capable of a linearity of ±0.15% and a repeatability of ±0.02% over extended periods of time.

Efforts to increase the resolution of these meters have traditionally sacrificed accuracy. Turbine meters of many varieties are now manufactured where the turbine blade drives a pulsing means through a direct gear connection. This gearing must be inserted into the flowing stream, and the output shaft to the external pulsing means must be sealed. This usually results in meter performance of ±1.5% linearity and a repeatability of ±0.2%, a reduction of meter performance by a factor of ten.

The purpose of this invention is to take advantage of the accuracy and repeatability of low resolution meters and yet prove these meters (establish an accurate K-factor) with a small volume displacement prover by delivering a very large number of pulses (representing very small discrete units of volume) generated by the prover which can be related to the pulse output of the meter, thus reversing the current concept of volumetric proving.

In this invention, only a single detector is used to define the calibrated volume, and since any variation in the switching action at the beginning of the proving run can be expected to repeat at the end of the proving run, the effects of detector resolution no longer exist. Therefore, the criterion remaining is to repeatably define the volume displaced in a meter prover when the meter under test has delivered a minimum of 10,000 pulses.

The present invention provides an accurate, simple and quick way to determine the K-factor of a flowmeter. The prover may be of any size so as to permit the required 10,000 pulses of the API code, or can be adapted to use a chronometry system. The prover may be compact and portable. Further, it is much less expensive.

Other objects and advantages of the invention will appear from the following discription.

SUMMARY OF THE INVENTION

According to the invention, fluid is adapted to flow through a piston and cylinder disposed in a housing of a meter prover. The cylinder is telescopingly received within the piston. The fluid is permitted to flow into the cylinder through an upstream inlet and leave through exit ports in the cylinder. A poppet valve is provided for closing the exit ports whereupon the piston becomes a fluid barrier and is adapted to move in synchrony with the fluid flow from the upstream fluid inlet. A single detector is provided which is activated at the start of the proving run and at the end of the proving run. A rack is mounted on the piston for turning a gear. The gear rotates a disc having a plurality of markings indicating the incremental displacement of the piston. A photopulser tranmits a pulse to a counter for each marking detected upon rotation of the disc. Sufficient piston displacement is permitted to generate a minimum of 10,000 pulses. The counter does not start counting pulses until a meter pulse is generated by the counter of the flowmeter.

BRIEF DESCRIPTION OF THE DRAWINGS

The features of specific embodiments of the best mode contemplated in carrying out the invention are illustrated in the drawings, in which:

FIG. 7 is a partial section view of still another embodiment of the prover of FIG. 4.

DETAILED DESCRIPTION OF THE SPECIFIC EMBODIMENTS

Figure 1:
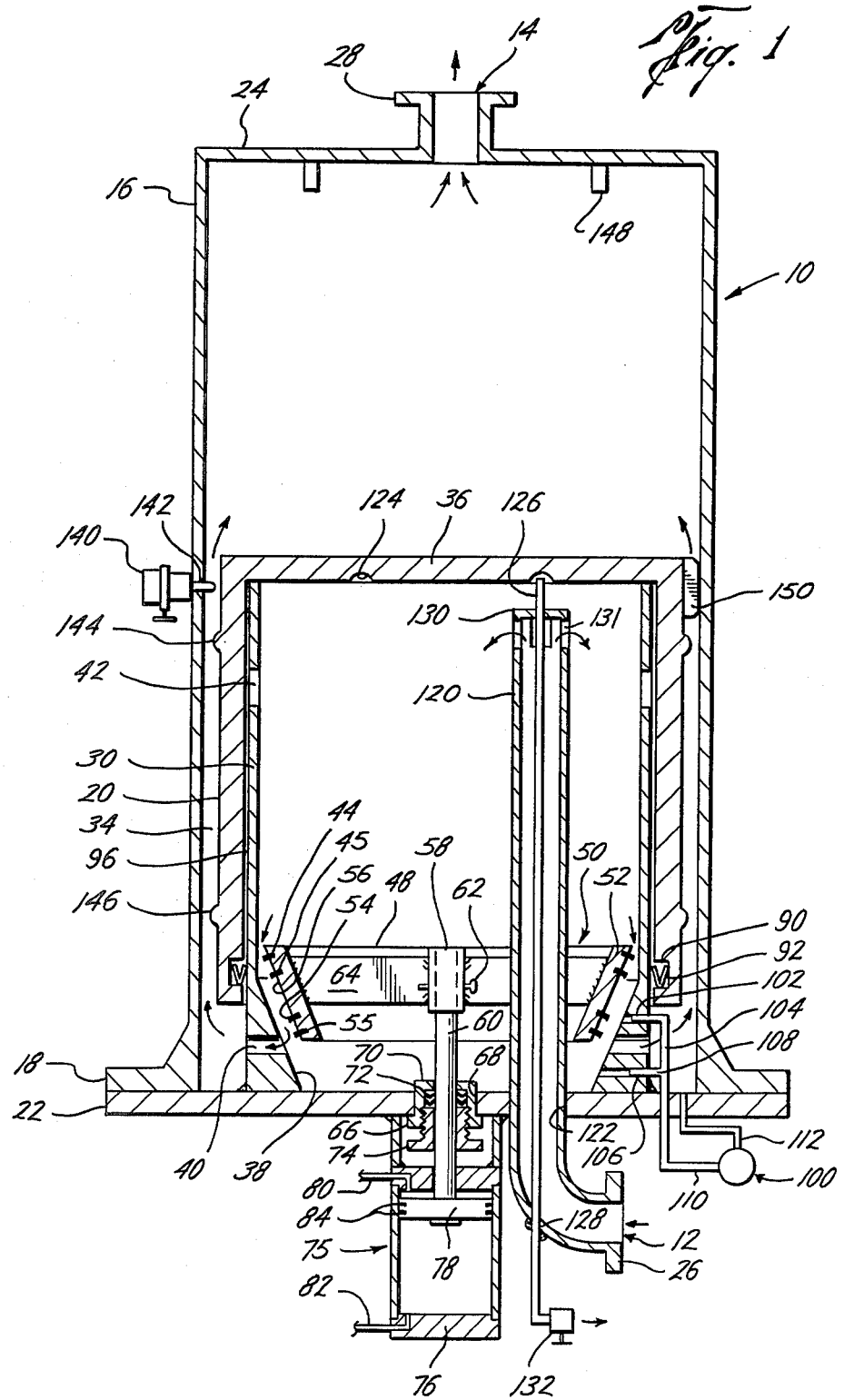
FIG. 1 is a section view of the prover incorporating the principal features of the invention, the prover being shown before the start of a proving run.

Referring initially to FIG. 1, meter prover 10 is disposed in the fluid line of a fluid system in series with a flowmeter, not shown. Fluid flows through the flowmeter located preferably upstream of the meter prover, and into a fluid line connected to the upstream fluid inlet 12 of meter prover 10. Fluid passes through meter prover 10 and flows downstream through downstream outlet 14. Normal fluid flow through the system is represented by the arrows shown in FIG. 1.

Meter prover 10, as shown in FIG. 1, includes a housing 16 having a piston 20 and cylinder 30, disposed within housing 16 with piston 20 adapted to move as a fluid barrier. Housing 16 has a generally cylindrical body with an upstream flange 18 at one end secured to end-plate 22 by means not shown. The downstream end of housing 16 is enclosed by end-plate 24. Housing 16 with end-plates 22, 24 forms a fluid enclosure for the passage of fluid between upstream fluid inlet 12 and downstream outlet 14. Upstream fluid inlet 12 and downstream fluid outlet 14 each have flanges 26, 28, respectively, for connecting meter prover 10 to the fluid line.

Cylinder 30 is enveloped and telescopingly received within piston 20, both being concentrically mounted within housing 16. Cylinder 30 and piston 20 are generally cylindrical and each has an open end and a closed end. End-plate 22 of housing 16 forms the closed end of cylinder 30. End-plate 36 forms the closed end of piston 20. The open end of cylinder 30 is received within the open end of piston 20, piston 20 being adapted to reciprocate over cylinder 30.

Figure 2:
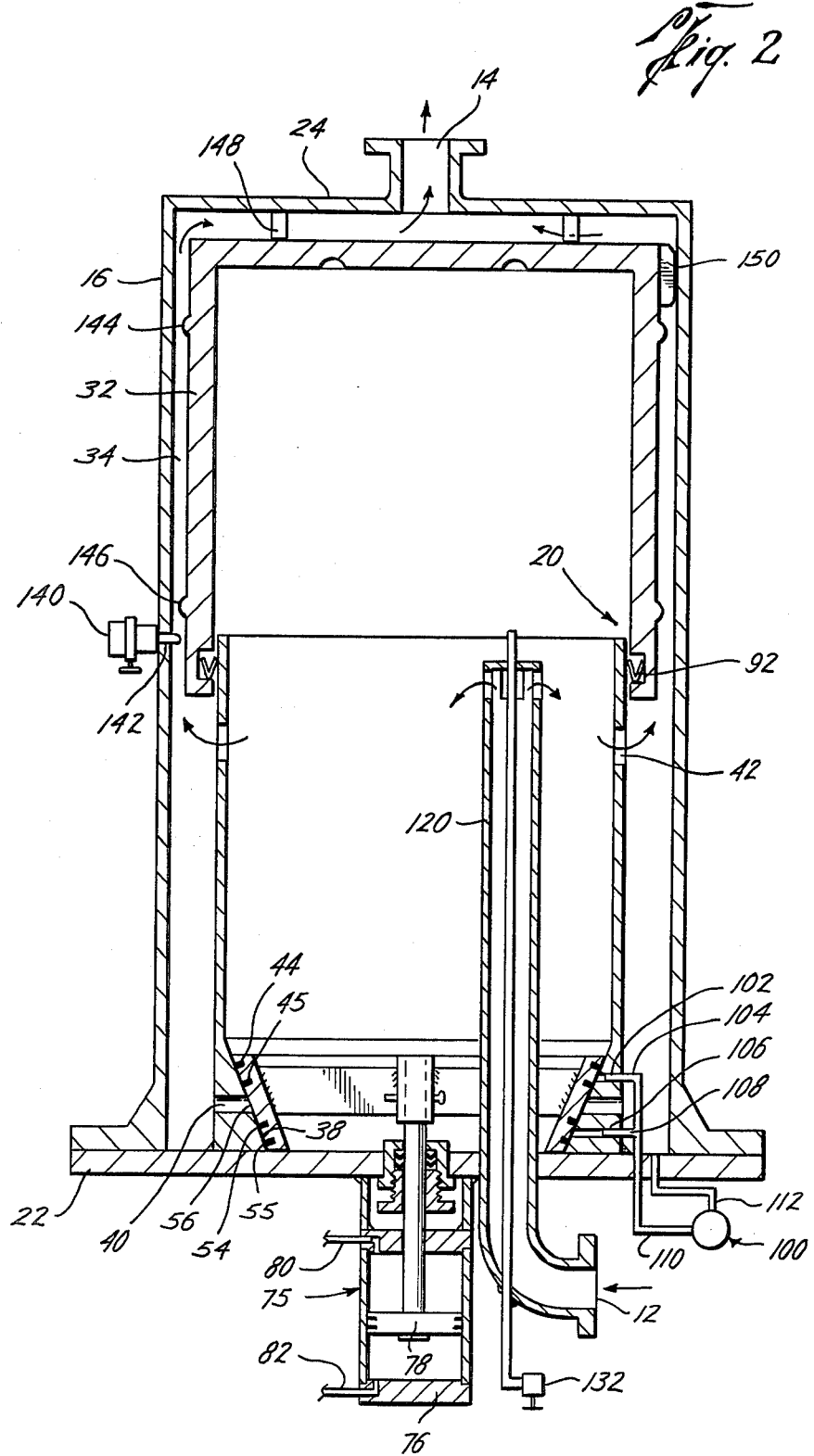
FIG. 2 is a section view of the prover of FIG. 1 with the prover being shown at the end of the proving run.

Cylinder 30 includes a series of exit ports 40 which are circumferentially disposed around that end of the cylindrical portion of cylinder 30 adjacent end-plate 22. A poppet valve, generally designated at 50, is disposed within cylinder 30 for preventing fluid flow through exit ports 40 and into annulus 34 formed between the cylindrical interior of housing 16 and the cylindrical exterior of piston 20 and cylinder 30. Poppet valve 50 includes a frustoconical shoulder or seat 38 formed by the interior of the cylindrical portion of cylinder 30 adjacent its closed end and a reciprocable valve plug 48 having a collar 52 with a frustoconical surface 56 adapted for sealing engagement with seal 38. Exit ports 40 pass through the mid-section of seat 38. Two pairs of resiliant seals 44, 45 and 54, 55 are disposed in annular grooves in the sealing face of surface 56 whereby upon closing poppet valve 50, as shown in FIG. 2, seals 44, 45 and 54, 55 circumscribe, above and below, respectively, exit ports 40 to block and seal exit ports 40 from fluid flow.

Plug 48 includes a hub 58 and circumferentially spaced webs 64 extending from hub 58 to collar 52. Hub 58 has a female portion receiving one end of an axially movable rod 60 and is connected thereto by any conventional means such as by threaded engagement and set screw 62. Rod 60 extends through a packing gland 66 disposed in aperture 68 centered in end-plate 22. Gland 66 includes a bushing 70 affixed within aperture 68 for receiving packing 72 around rod 60. Gland 66 has interior threads for threadingly engaging a packing nut 74 for compressing packing 72.

The hydraulic actuator 75 for poppet valve 50 includes a cylinder 76 attached to the exterior of end-plate 22 and is concentrically aligned with aperture 68. Rod 54 extends into cylinder 76 and is attached to actuator piston 78 which reciprocates within cylinder 76. Hydraulic ports 80, 82 are disposed in opposite ends of cylinder 76 to apply hydraulic pressure to either side of actuator piston 78 to open or close poppet valve 50. Seals 84 are disposed in peripheral annular grooves in actuator piston 78 for sealing engagement with the interior of cylinder 76.

Piston 20 includes an inner annular groove or channel 90 adjacent its open end in which is disposed a unidirectional seal 92 sealingly engaging the external surface of cylinder 30. Cylinder 30 includes a second series of exit ports 42 circumferentially disposed around that end of the cylindrical portion of cylinder 30 adjacent its open end. Unidirectional seal 92 and groove 90 are positioned on piston 20 so that piston 20 can rise sufficiently on cylinder 30 to clear exit ports 42 and permit fluid flow into annulus 34 as shown by the arrows in FIG. 2. Thus, until piston 20 travels sufficiently for seal 92 to pass over exit ports 42, the unidirectional seal 92 seals fluid flow through annulus 96 between piston 20 and cylinder 30.

Referring to FIG. 1, a leakage indicator 100 is provided to confirm the poppet valve seal between sealing surface 56 and seat 38 and thus exit ports 40. Seal pairs 44, 45 and 54, 55 each form annular sealing areas therebetween upon closure of poppet valve 50. A first port 102, connected to branch conduit 104, extends through seat 38 to the annular sealing area between seals 44, 45, and a second port 106, connected to branch conduit 108, extends through seal 38 to the annular sealing area between seals 54, 55. Branch conduits 104, 108 communicate with main conduit 110 which passes through an aperture in end-plate 22 to leakage indicator 100. Another conduit 112 also extends from leakage indicator 100, through end-plate 22 and into annulus 34. Leakage indicator 100 monitors the pressure in annulus 34 through conduit 112 and the pressure in the annular sealing areas between seal pairs 44, 45 and 54, 55. When poppet valve 50 is closed, leakage indicator 100 will register a positive pressure differential between conduits 110, 112. If no pressure differential is registered, poppet valve 50 is leaking, as described in U.S. Pat. No. 3,738,153, Valveless Prover, C. R. Simmons.

Referring again to FIG. 1, a J-tube or inlet tube 120, having upstream fluid inlet port 12 at its outer end, extends through an aperture 122 in end-plate 22, between webs 64 on poppet plug 48 and toward end-plate 36 of piston 20. That end of inlet tube 120 adjacent end-plate 36 of piston 20 has an end-plate 130 and a plurality of azimuthally spaced apertures 131 as outlets for fluid flowing through 120. Inlet tube 120 extends almost the contracted length of piston 20 to insure fluid flow from the open end of cylinder 30 to exit ports 40 at its lower end and thereby prevents any stagnant fluid within the area confined by piston 20.

An annular trap groove 124 is provided around the inner face of end-plate 36 to collect any bubbles of trapped air within piston 20. An air escape tube 126 extends the length of inlet tube 120 and into trap groove 124 when the piston 20 is in the contracted position. Air escape tube 126 passes through aperture 128 in inlet tube 120 near upstream fluid inlet 12 and is concentrically disposed in inlet tube 120 by end-plate 130 at the exit end of inlet tube 120. Fluid flowing from tube 120 exits through apertures 131 to avoid directing fluid into trap groove 124. An air vent valve 132 is positioned on the portion of air escape tube 126 extending exteriorly of meter prover 10 to permit the venting of any trapped air within trap groove 124 as fluid fills cylinder 30.

The detection system for meter prover 10 includes a single detector 140 mounted on the exterior of housing 16 and having a toggle switch 142 extending through an aperture in housing 16 and into annulus 34. A first and second trip means such as annular ribs or projections 144, 146 are disposed around the exterior of piston 20. First annular rib 144 is located adjacent the closed end of piston 20, and second annular rib 146 is adjacent the open end of piston 20. Ribs 144, 146 are adapted to engage toggle switch 142 as piston 20 moves.

Bumpers or stops 148 may be mounted on the interior of end-plate 24 of housing 16 to halt the upward axial movement of piston 20 after completion of the prover run. Stops 148 include individual projections from end-plate 24 so as not to prevent fluid flow around the end of piston 20.

A plurality of guide shoes 150 may be affixed to the upper end of piston 20 to insure a concentric axial movement of piston 20 within housing 16 thereby preventing piston 20 from misaligning (cocking) within housing 16 and failing to reciprocate.

During normal operation of the fluid system, as shown in FIG. 1, in which meter prover 10 is connected, hydraulic actuator 75 applies hydraulic pressure through port 82 and against piston 78 thereby maintaining poppet valve 50 in the open position. With poppet valve 50 in the open position, upstream fluid passes through the flowmeter and enters upstream fluid inlet 12, flows through inlet pipe 120 and into piston 20 and cylinder 30. Fluid flows through piston 20 and cylinder 30, passes through exit ports 40 and into annulus 34 around piston 20 and cylinder 30. The fluid exits housing 16 through downstream fluid outlet 14. Thus, fluid flows through meter prover 10 unimpeded as illustrated by the arrows in FIG. 1.

To initiate a meter prover run, as shown in FIG. 2, to test, calibrate, and/or prove the flowmeter, hydraulic actuator 75 applies hydraulic pressure through port 80 and against piston 78 to move poppet valve 50 to the closed position thereby preventing fluid flow through exit ports 40. Seals 44, 45 and 54, 55 of poppet valve 50 are checked by leakage indicator 100 to insure that there is no leakage through exit ports 40. After poppet valve 50 is closed, fluid pressure from the flowing fluid through inlet pipe 120 into piston 20 and cylinder 30 causes piston 20 to move in synchronism with the fluid flowing through the flowmeter upstream. Piston 20 acts as a fluid barrier to the fluid flow into piston 20 and cylinder 30 causing it to rise on cylinder 30 telescoping piston 20. The prover is substantially pressure balanced in that the pressure within cylinder 30 is substantially the same as the pressure in housing 16 around piston 20 and cylinder 30. A substantial pressure differential would affect the movement of piston 20 within housing 16.

The prover run is initiated by first annular rib 144 engaging toggle switch 142. The measured run ends upon second annular rib 146 engaging toggle switch 142.

As piston 20 telescopes between engagement of ribs 144 and 146 with toggle switch 142, a given volume of fluid is displaced by piston 20, i.e., a volume equal to the product of the internal cross-sectional area of piston 20 times the distance between annular ribs 144, 146. This given volume is compared with the response of the flowmeter, to establish the meter factor.

Toward the end of the prover run, unidirectional seal 92 around the lower inner end of piston 20 clears exit ports 42 and permits fluid flow out of piston 20 and cylinder 30 and into annulus 34 where the fluid passes out of housing 16 via downstream fluid outlet 14.

When the prover run is completed, hydraulic actuator 75 moves poppet valve 50 to the open position and fluid again flows through exit ports 40. Piston 20 is permitted to move to its contracted position by gravity. After unidirectional seal 92 passes and closes exit ports 42, all fluid flow will pass through exit ports 40. Meter prover 10 is then ready for a new test run.

Figure 3:
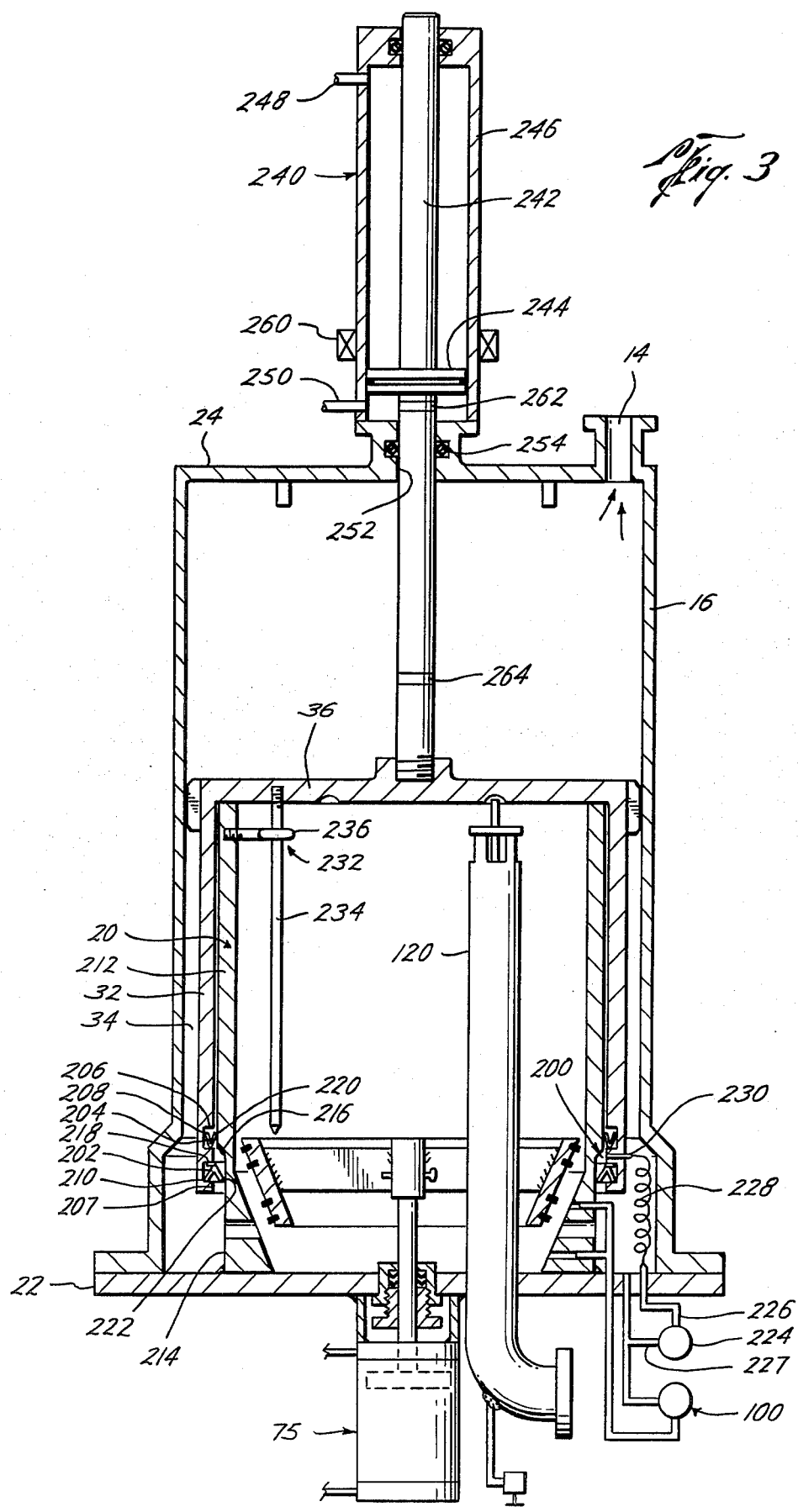
FIG. 3 is a section view with additional features and modifications to the prover of FIGS. 1 and 2.

Referring now to FIG. 3, additional features and modifications to the preferred embodiment of FIGS. 1 and 2 have been shown. Those elements of FIG. 3 common to the preferred embodiment shown in FIGS. 1 and 2 bear the same reference numerals. As shown in FIG. 3, the unidirectional seal 92 of the preferred embodiment may be replaced with a leak detecting dynamic seal 200. Dynamic seal 200 includes an upwardly facing upper annular expanding-ring seal 204 mounted back to back to a downwardly facing lower annular expanding-ring seal 202. Upper seal 204 and lower seal 202 are mounted in inner annular grooves 206, 207, respectively, around the inner wall at the lower open end of piston 20. Upper seal 204 has an outer annular rim 208 and an inner annular rim 220 which sealingly engage the bottom of groove 206 and exterior of cylinder 212, respectively. Seals 202, 204 may be "Spring-Ring" seals commercially available from the Fluorcarbon Mechanical Seal Division in Los Alamitos, Calif.

Cylinder 212 shown in FIG. 3 differs from cylinder 30 of the preferred embodiment in that cylinder 212 has a reduced diameter portion 214 adjacent the closed end. Reduced diameter portion 214 forms an annular shoulder 216 around cylinder 212.

Annular shoulder 216 is positioned on cylinder 212 so as to project between upper seal 204 and lower seal 202 when piston 20 is in its contracted position, i.e., piston 20 is in its lowermost position. Downwardly facing lower annular expanding-ring seal 202 includes an outer annular sealing rim 210 and an inner annular sealing rim 222. Outer rim 210 and inner sealing rim 222 do not sealingly engage the bottom of groove 207 and the reduced diameter portion 214 of inner vessel 212 until piston 20 moves upwardly and lower seal 202 becomes compressed between that portion of the external surface of cylinder 212 above shoulder 216 and the bottom of groove 207.

A leakage sensor 224 includes a conduit 226 passing through an aperture in end-plate 22. Conduit 226 is connected to a flexible tube or hose 228 that extends to a conduit 230 passing through the lower end of piston 20 into the annular space between piston 20 and cylinder 212. A second conduit 227 from leakage sensor 224 extends into the annulus 34 between cylinder 212 and housing 16.

To prevent piston 20 from rotating with respect to cylinder 212, a guide means 232 is mounted on piston 20. Guide means 232 may include a guide pin 234 mounted on end-plate 36 and extending inwardly and passing through a guide ring 236 attached to cylinder 212. Thus, as piston 20 reciprocates with respect to cylinder 212, guide pin 234 cooperates with guide ring 236 to prevent the rotation of piston 20 with respect to cylinder 212.

When not in operation, leak sensor 224 will register no pressure difference between conduit 226 and the second conduit 227 extending into annulus 34. However, during the prover run, lower seal 202 will be compressed by piston 20 rising with respect to cylinder 212. As piston 20 rises, inner sealing rim 222 of lower seal 202 rides up annular shoulder 216 and sealingly engages the external surface of cylinder 212 at the same time outer sealing rim 210 sealingly engages the bottom of groove 207. Upon such sealing engagement, the pressure within the annular space between upper and lower seals 204, 202 creates a negative pressure differential which is noted by leak sensor 224. Such an indication will show that the lower seal 202 is sealingly engaging cylinder 212. However, if there is no pressure differential, this will indicate that leakage is occurring.

Referring again to FIG. 3 and another modification to the preferred embodiment, there is shown a hydraulic actuator 240 mounted on end-plate 24 of housing 16. Actuator 240 includes an indicator rod 242 having a piston 244 mounted thereon which reciprocates within a cylinder 246. Hydraulic ports 248, 250 are disposed in the upper and lower end, respectively, of cylinder 246 to provide hydraulic actuation of piston 244. Indicator rod 242 extends through aperture 252 in end-plate 24 and into the interior of housing 16. Annular seals 254 are provided at aperture 252 to seal indicator rod 242 with end-plate 24. The end of indicator rod 242 projecting into housing 16 is affixed to the top of outer vessel 32. Hydraulic actuator 240 is actuated to move outer vessel 32 to its lowermost position.

Another modification of the preferred embodiment as shown in FIG. 3 includes mounting a single detector 260 on the exterior of hydraulic actuator 240. A plurality of magnetic position indicators such as 262 and 264 are disposed on indicator rod 242. As piston 20 reciprocates, magnetic positioner indicator 262 trips detector 260 to initiate the prover run, and magnetic position indicator 264 trips detector 260 to complete the prover run. Detector 260 may be a magnetic reed switch sensitive to the change in magnetic field as magnetic position indicators 262, 264 pass detector 260.

Figure 4:
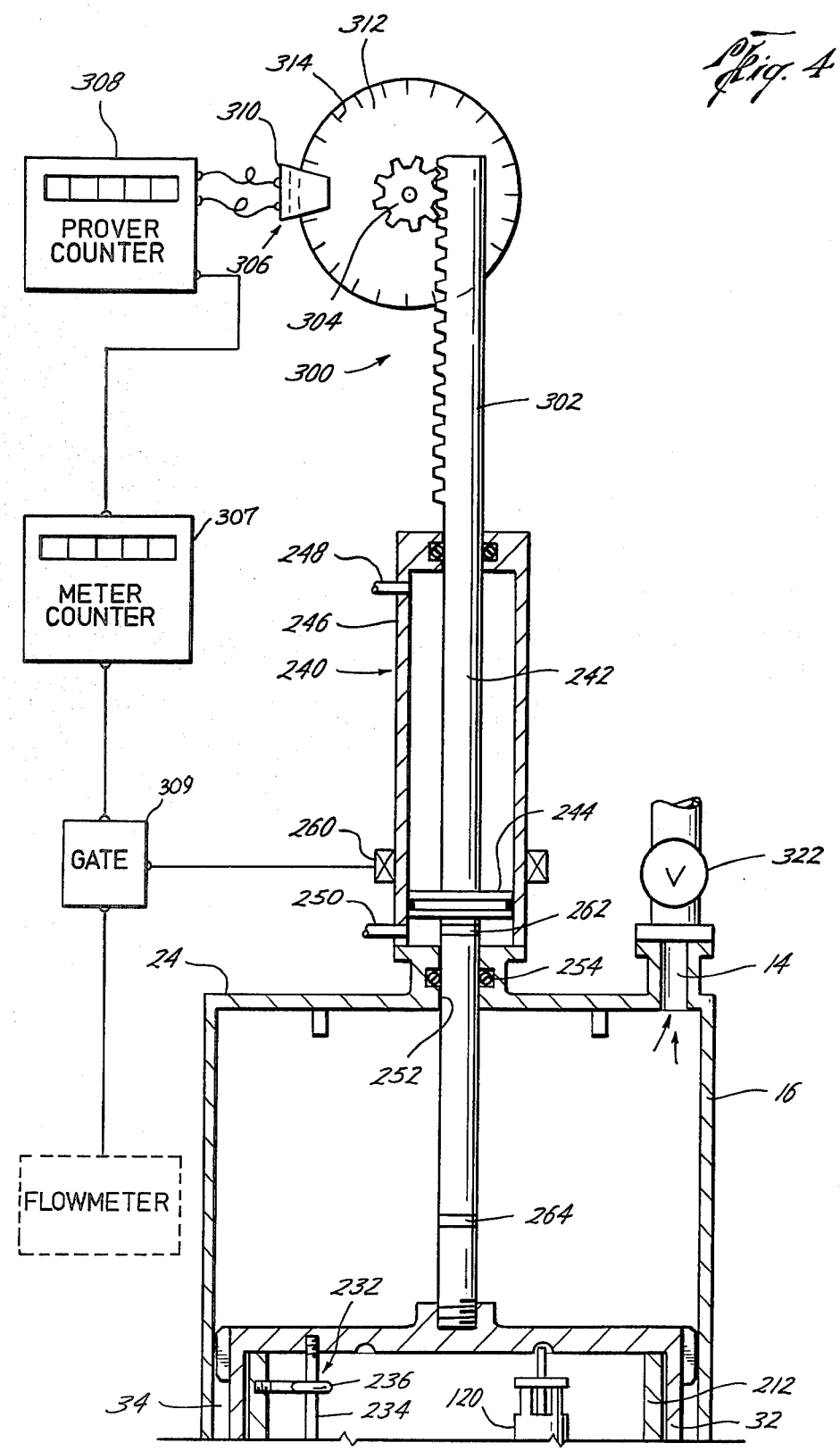
FIG. 4 is a partial section view of another embodiment of the prover of FIG. 3.

Referring now to FIG. 4, there is shown an additional embodiment of the present invention. In this embodiment, pulse counting assembly 300 is affixed to the exterior of end-plate 24 of housing 16. Assembly 300 includes a rack 302 and gear 304 with rack 302 being attached to, or an extension of, rod 242 disposed on the top of piston 20. Assembly 300 also includes commercially available photopulser 306 having a pulse counter 308 connected to an encoder 310 monitoring disc or wheel 312 mounted on gear 304. A typical such assembly with pulsers and counters is manufactured by Control Instruments, Inc. of Houston, Tex. Disc or wheel 312 has a large number of windows or markings 314 azimuthally spaced around wheel 312 to activate pulse counter 308 as gear 304 rotates on rack 302. Each marking 314 represents a displacement of piston 20 as piston 20 moves in synchrony with fluid flow into cylinder 212.

Photopulser 306 is capable of delivering a large number of discrete pulses per revolution (typically 1000 pulses per revolution). Rack 302 and gear 304 can also be constructed similarly to the method shown in FIG. 2 of U.S. Pat. No. 3,492,856 so as to shorten the overall length of the proving assembly.

Rack 302 is somewhat longer than the distance (volume) defined by the magnetic position indicators 262, 264 to allow a pre-run of rack 302 before initiating the calibration of prover 10. Another alternative includes locating the windows or markings 314 along rack 302. Commercial pulsers can detect linear markings as well as azimuthally spaced markings on a disc or wheel. For example, markings 314 could be a plurality of teeth along rack 302.

The most common method calibrating the displaced volume of a meter prover is the water-draw method which will be used in a simplified example to explain the operation of the embodiment of the invention described in reference to FIG. 4.

At the beginning of a calibration, poppet valve 50 is seated and water entering inlet 12 causes piston 20 and rod 242 to move toward outlet 14. Water is wasted from outlet 14 of prover 10 as magnetic indicators 262, 264 move toward detector 260. Rack 302 also rotates gear 304 and photopulser wheel 312. However, no pulses are counted by pulse counter 308. The instant magnetic indicator 262 causes detector 260 to activate, valve 322, through which water has been wasting, is closed (usually by an electric solenoid valve actuation) stopping the movement of piston 20 and the associated rod 242, rack 302, gear 304 and photopulser 306. Activation of detector 260 also enables electronic counter 308, which records the subsequent number of pulses generated by photopulser 306 during the calibration run. Valve 322 has been shut to permit attachment of a certified container (or containers) to collect the water during the calibration run. Outlet valve 322 is again opened after directing the water into the certified container. Water is collected in the certified container until detector 260 is again activated by second magnetic indicator 264 at which time outlet valve 322 is immediately closed and the electronic counter 308 is disabled, ceasing the recording of pulses from photopulser 306. Note, the recording of pulses from photopulser 306 will automatically stop upon closing outlet valve 322, as piston 20 with associated rod 242, rack 302 and gear 304 must stop with the cessation of fluid flow. By disabling electronic counter 308, effects of pulsations and backlash are eliminated. The fluid volume collected in the certified container is recorded and corrected for temperature and pressure effects in accordance with current API code practice, and the pulse count from counter 308 is also recorded.

Piston 20 is returned to the starting position either by gravity or hydraulic actuator 240 and a second calibration run is made. To conform to the API code, repeated calibration runs are made until two successive calibration volumes, after corrections for temperature and pressure effects, agree without 0.02%. By using precision anti-backlash gearing in association with this embodiment of the invention, the recorded pulse count from counter 308 during calibration will also agree within 0.02%.

The foregoing illustrates the method of calibrating prover 10. The following discussion indicates a typical design and operation of prover 10 for establishing the K-factor for a flow-meter.

A 12-inch turbine meter will be used for this example. A 12-inch meter has a nominal useful flow range from 2,500 to 18,000 barrels per hour, and delivers 250 pulses per barrel (38.8 cubic inches volume per pulse). At maximum flow rate, the meter has a throughput of 5 barrels per second.

The calibrated volume would likely be chosen to be 10 barrels or more to allow sufficient time for a run since, at maximum flow, the proving run is completed in only 2 seconds. If prover piston 20 was chosen at a nominal diameter of 40 inches, it would travel 6.43 feet to displace the 10 barrel volume, and magnetic position indicators 262, 264 would be spaced a distance equal to the piston travel, i.e., 6.43 feet along rod 242 with rack 302 having a length longer than the length of piston travel.

If a 32 pitch, 20 degree pressure angle rack 302 is used with a 2-inch Pitch Diameter Anti-Backlash gear 304 driving photopulser wheel 312, then wheel 312 will turn 12.297 revolutions for the piston displacement just cited. If photopulser wheel 312 had 1000 "windows" to generate 1000 prover pulses per revolution, 12,297 prover pulses would have been counted while the flow-meter displaced the 10 barrel calibrated volume. The flowmeter itself would deliver 250×10=2,500 meter pulses at 38.8 cubic inches per pulse while prover 10 delivered 12,297 prover pulses representing: 10 barrels ×9702 cubic inches per barrel divided by 12,297 prover pulses =7.9 cubic inches per prover pulse, an approximate 5 fold increase in discrimination. The use of photopulser wheels with greater numbers of windows would offer finer and finer discrimination until a practical limit is reached.

To establish the K-factor for the 12-inch meter, using the concept of this embodiment of the invention, two simple electronic counters would be used; one to count the meter pulses delivered from the meter (meter counter 307), and the other to count the prover pulses delivered by the prover (prover counter 308). On the initiation of a proving run, prover counter 308 is not started immediately on the actuation of detector 260 by magnetic positioner indicator 262 (or the first actuation of the single detector of the preferred embodiment of the invention). The actuation of detector 260 merely enables the meter counter gate circuits 309. The flowmeter would then complete the sinusoidal phase of the meter pulse in process, and the instant the 0.7 volt "single shot" voltage is received by the meter pulse counter 307, the prover pulse gate circuit in counter 308 is enabled by the meter pulse counter 307 thereby allowing the counting of both the meter pulses and prover pulses simultaneously by the meter pulse counter 307 and prover counter 308.

The meter counter 307 would be a predetermining type, and a sufficient number of counts would be pre-set into the meter counter to assure that a minimum of 10,000 counts would be received from the photopulsers 306.

Figure 6:
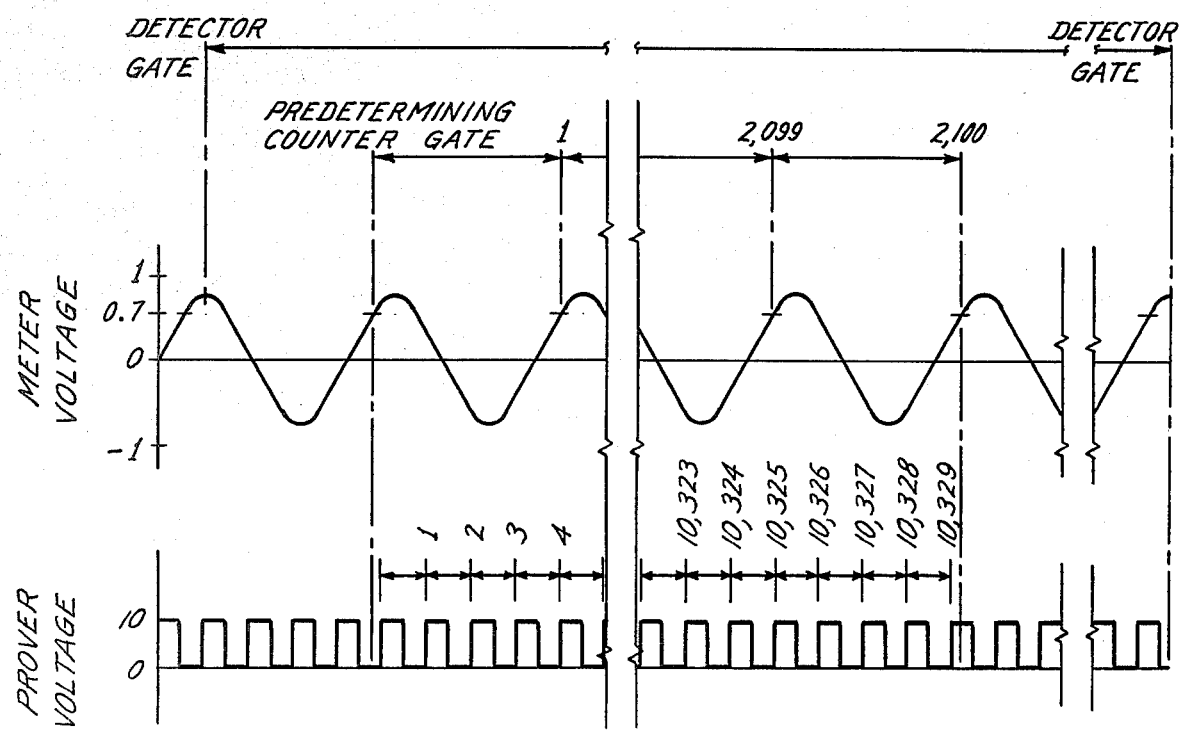
FIG. 6 demonstrates graphically the means by which the prover of the present invention overcomes the error shown in FIG. 5.

If 2,100 meter pulses were chosen for example, 10,329 photopulses would be counted when the predetermining meter counter 307 would disable the prover pulse gate circuit after counting the complete 2,100 meter pulses, as shown in FIG. 6. Note that meter counter 307 is counting complete meter pulses, and is not subject to the one meter pulse volume uncertainty hereinafter described, although the pulse count from the prover counter 308 will be subject to one prover pulse volume uncertainty. Since the prover delivered in excess of 10,000 pulses, this error is only one part in 10,000 and acceptable to the criteria of the API code.

It will be noted that only position indicator 262 is useful in this application to enable the gate circuits of counter 308. A second actuation by position indicator 264 at the end of the defined volume serves no further purpose in establishing the meter K-factor.

The K-factor is computed as follows:

7.9 cubic inches per prover pulse—from the previous calibration example.

10,329 pulses counted by prover counter 308 during the proving run.

2,100 meter pulses counted by the meter pulse counter during the proving run.

10,239 (7.9) divided by 2,100=38.8 cubic inches per meter pulse.

This is only a simplified example. In actual practice, corrections involving temperature, pressure, and fluid properties are considered which have been neglected in this example. Either a change in factor can be determined, or if the K-factor is unknown, it can be established using the principle of the example.

In still another embodiment of this invention which can be illustrated in FIG. 7, the piston position detector 260 and magnetic indicators 262, 264 are eliminated. Detector 260 can be replaced by physical measurement. Two conveniently spaced markings 314, 316 are made on rod 242 of prover 10 of the previous example (assume with a sharp metal punch) at a distance which will approximately define the calibrated volume desired. A pointer 320 is installed on prover 10 which enables accurate visual tracking of markings 314, 316.

Prover 10 is positioned for the start of calibration, and water is wasted through dump valve 322 until the first marking 316 appears exactly opposite pointer 320. Dump valve 322 is then diverted into a certified container, and the volume displaced by piston 20 is carefully measured until the second marking 314 on indicator rod 242 appears directly opposite pointer 320. A minimum of two calibration runs, agreeing within 0.02% after the application of correction factors, is considered a valid calibration.

The separation distance of markings 314, 316 is then carefully measured, and the rack 302, gear 304 and pulser assembly 300 of the previous example is installed. Since rack 302 and gear 304 have a fixed and finite relationship with linear distance, the exact number of revolutions of gear 304 can be easily calculated for the distance measured between markings 314, 316 on rod 242. As this distance represents a calibrated volume, the single pulse volume of the photopulser 306 may also be easily calculated. Note that this is a fixed, non-varying mechanical relationship.

Determining a meter's K-factor using the concept described in reference to FIG. 7 is similar to the method shown in the first embodiment using a single detector with ribs 144, 146 mounted on piston 20 in FIGS. 1 and 2. In operation, the prover piston 20 and rod 242 are allowed to pass the first indicator point 316, and then a simple manual push button contact is made to enable the pulse counter 308. As long as the predetermined number of meter pulses does not exceed the capacity of the rack (falls between the two calibration marks) the factor may be computed exactly as in the preceding example which used a detector.

This concept eliminates the use of electromechanical detectors on a prover to define the calibrated volume and eliminates any question of detector repeatability or the ability of a detector to accurately sense the position of a prover piston. The detector, or manual push button of this concept is merely used as a circuit enabling device; the rising voltage of the meter pulse is the gating (both off and on) means for the electronic counters in this concept.

This invention is not limited to the use of a rack, gear and photopulser as illustrated in the preceding examples. A linear displacement transducer system similar to the Temposonics design manufactured by Temposonics Incorporated could be incorporated into the rod design or piston indicator means of the example prover. These units deliver either a digital pulse train proportional to linear displacement or an analog voltage output proportional to linear displacement. Using this equipment, the prover pulse counter would count the pulses delivered from the linear transducer in the same manner as the preceding examples counted the pulses from the photopulser.

An analog signal from the linear transducer can also be used to define the volume delivered by the prover. A computer would register the voltage at the start of calibration (assume 1.3251 volts) and at the end of calibration (assume 11.8632 volts). The difference between these values then represents the displaced volume of the prover. This 10,5381 voltage span is then programed into the computer and subsequent voltage differentials during meter calibrations are compared to this base span for volume displacement for the predetermined meter pulse gates.

Meter pulses generated by the reluctance or inductance method are generated similarly to the classical sinusoidal alternating current wave where the voltage rises from zero to a maximum and back to zero then to a negative maximum back to zero, to complete the meter pulse. Modern electronic counters operate by triggering on a rising voltage only. Therefore, if the preceding sinusoidal pulse were to vary from plus and minus one volt, for example, and the meter pulse counter would trigger on a rising voltage of 0.7 volt, the count would only register the instant this voltage is reached, and at no other time during the sinusoidal cycle.

Figure 5:
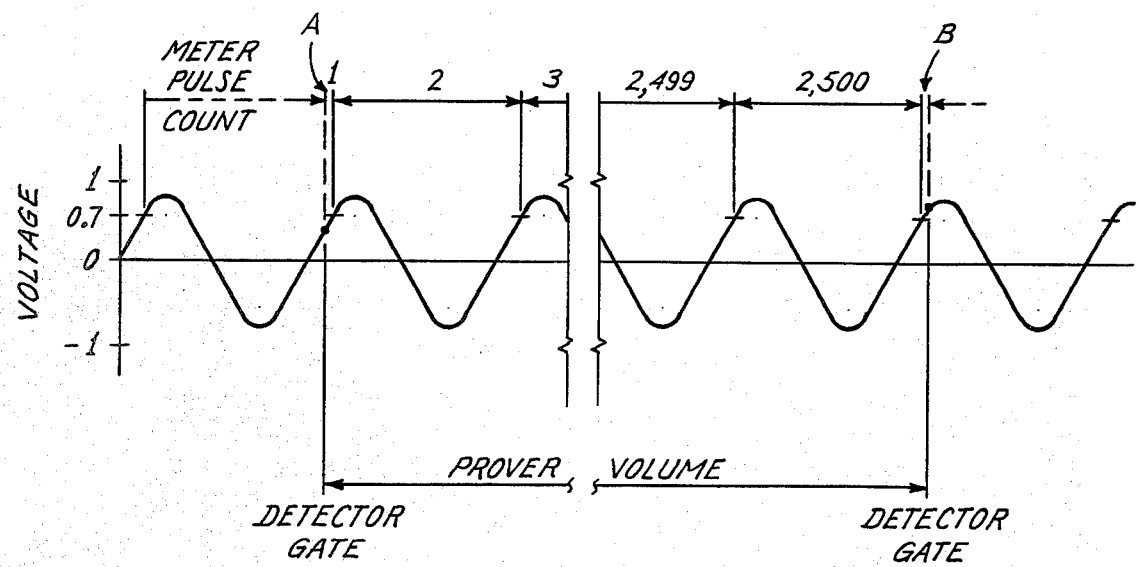
FIG. 5 is a sinusoidal wave generated by a common circuit for a prior art conventional meter prover illustrating error in the pulse count.

Referring now to FIG. 5, possible error in using a conventional meter prover is illustrated. If at the beginning of a proving cycle the first detector enables a meter counter just before the 0.7 volt potential was generated by the meter's pickup coil (assume 0.69 volt), the meter counter would immediately register a full single pulse volume (38.8 cubic inches) as having passed through the meter when this actually did not happen, as shown at A in FIG. 5. Similarly, if at the end of the proving cycle, the second detector disabled the counter gate circuit just after the 0.7 volt potential was generated, a full one pulse volume would be counted as if delivered, as shown at B in FIG. 5. In neither case did a full meter pulse volume pass through the meter.

A common rectifier circuit is often used to increase resolution by enabling the meter counter to register a meter pulse for the negative half of the sinusoidal wave. However, as shown in FIG. 5, three will always be an uncertainty of one meter pulse volume. In meters of very low resolution (10 pulses per barrel, for example), the prover volumes are either very large, or methods of electronically increasing the resolution, generally referred to as "double chronometry," have been employed. Such a method is shown in the Francisco, Jr. U.S. Pat. No. 3,403,544. This particular method, using a high frequency oscillator for increased pulse generation, has the disadvantage of being flow rate sensitive. If the flow rate is too slow during a proving cycle, the meter pulses delivered by the meter would be slow accordingly, but the oscillator pulse rate would remain constant, thereby the system would record additional pulses per meter pulse than would have been recorded if the flow rate had remained constant. The reverse is, of course, true if the flow rate were to increase.

Another method of pulse interpolation is known as the "phase-locked loop," where the discrimination of the system is independent of flow rate. All pulse interpolation systems have thus far met with resistance, principally because of the extra electronics associated with the system.

Referring now to FIG. 6, there is shown therein the mechanism of the present invention, described above, for improving the uncertainty for proving a flowmeter from plus or minus one meter pulse volume or more (FIG. 5) to plus or minus one prover pulse volume.

While a preferred embodiment of the invention has been shown and described, other modifications thereof can be made by one skilled in the art without departing from the spirit of the invention. The following are some examples of such variations. Poppet valve 50 and hydraulic actuator 75 may be located upstream of fluid inlet 12 rather than inside cylinder 30 with an appropriate bypass of housing 16, piston 20, and cylinder 30 for normal fluid flow. Leakage indicator 100 need not have its pressure conduit passing through end-plate 22 but may have its conduit passing through piston rod 60, web 64, and into and through collar 52 to the sealing areas between seals 44, 45 and 54, 55. Further, it may be found to be advantageous to bend that portion of inlet tube 120 located inside cylinder 30 so that its open end is concentric with housing 16. Thus, fluid would flow from inlet tube 120 to the upper center of cylinder 30. Another modification might include having vertical and/or horizontal sealing faces for poppet valve 50 between seat 38 and surface 56 rather than conical sealing surfaces. Locating poppet valve seals 44, 45 and 54, 55 in a horizontal and flat sealing surface, for example, would enhance their retention in their grooves and would permit easy replacement. Another modification might include the use of an O ring seal rather than a unidirectional seal 92. The above modifications are merely illustrative and are not inclusive of all modifications that might be made by one skilled in the art without departing from the spirit of the invention.

What is claimed is:

1. A meter prover for calibrating a flowmeter, comprising:
   a conduit in flow communication with the flowmeter;
   expansible chamber means for measuring fluid volume, said chamber means including a container means and a barrier means, said container means being disposed within said conduit and said barrier means being adapted to move with respect to said container means in synchrony with fluid flow;
   first indicator means for indicating the beginning of the measurement of said volume;
   second indicator means for indicating the end of the measurement of said volume; and
   a single detector activated by said first indicator means and deactivated by said second indicator means for defining a precise volume of fluid in said chamber means.

2. The meter prover of claim 1 wherein said first and second indicator means are mounted on said barrier means and said single detector is mounted on said conduit.

3. The meter prover of claim 1 wherein said container means has an open end and a closed end and said barrier means includes a skirt.

4. The meter prover of claim 3 wherein said open end of said container means is slidingly received within said skirt whereby said barrier means covers said open end.

5. The meter prover of claim 1 wherein said container means comprises a cylinder disposed in said conduit, said cylinder having a closed end and an open end, and said barrier means comprises a piston closing said open end of said cylinder and being adapted to move in synchrony with fluid flow.

6. The meter prover of claim 5 wherein said piston is cylindrical with a closed end and an open end whereby said open end of said cylinder is telescopingly received within said open end of said piston.

7. The meter prover of claim 6 wherein said cylinder includes an inlet for receiving fluid flow and an outlet for expending fluid flow.

8. The meter prover of claim 7 further including means for closing said outlet to fluid flow during the measurement of said volume.

9. The meter prover of claim 1 further including an extension mounted on said expansible chamber adapted to move with the expansion of said expansible chamber, said first and second indicator means mounted on said extension and said single detector mounted on said conduit.

10. An apparatus for measuring fluid flow comprising:
- a main conduit through which fluid flows from an upstream position to a downstream position;
- a piston and cylinder located within the conduit;
- a first passage through said cylinder providing a path for fluid flow from the upstream position to the downstream position when said piston is in the contracted position;
- means for blocking said first passage, said piston being adapted to move in synchrony with fluid flow in the conduit when said first passage is blocked;
- a second passage through said cylinder providing a path for fluid flow from the upstream position to the downstream position when said piston is in the moved position; and
- detector means for detecting the movement of said piston.

11. The apparatus of claim 10 wherein said detector means includes a single detector for engaging a first sensor on said piston upon the beginning of the measuring of fluid flow and for engaging a second sensor on said piston upon the completion of the measuring of fluid flow.

12. The apparatus of claim 10 wherein said detector means continuously measures the movement of said piston throughout the measuring of fluid flow.

13. The apparatus of claim 12 wherein said detector means includes a plurality of continuous indicators and an indicator counter, each said indicator measuring a different displacement of said piston during the measuring of fluid flow.

14. The apparatus of claim 13 wherein said detector means includes:
- a rack mounted on said piston and adapted to move with said piston during the measuring run;
- a gear engaging said rack for rotation upon movement of said rack;
- a wheel adapted to rotate in synchrony with said gear, said plurality of indicators being disposed on said wheel; and
- counter means for counting the indicators upon rotation of said wheel.

15. The apparatus of claim 10 wherein said piston is cylindrical and telescopingly and slidingly receives said cylinder.

16. The apparatus of claim 15 further including seal means for sealing between said cylinder and piston.

17. The apparatus of claim 16 wherein said seal means is a unidirectional seal which only seals the annulus between said cylinder and piston from the flow of fluid from inside said cylinder.

18. The apparatus of claim 17 wherein said unidirectional seal is a spring seal.

19. The apparatus of claim 17 wherein said unidirectional seal is mounted in an annular groove in the inner periphery of said piston.

20. The apparatus of claim 16 further including leak detection means for detecting any leakage of fluid between said piston and cylinder.

21. The apparatus of claim 20 wherein said seal means includes a first seal for sealing between said cylinder and piston and a second seal adjacent the end of said piston and adapted for sealing between said cylinder and piston after a predetermined displacement of said piston.

22. The apparatus of claim 21 wherein said cylinder includes a reduced diameter portion adjacent said first passage creating an annular shoulder, said second seal being adjacent said reduced diameter portion and in a non-sealing position in said contracted position and adjacent said shoulder sealing engaging said shoulder in said moved position.

23. The apparatus of claim 22 wherein said second seal is a spring seal having an inner and outer sealing rim, said inner and outer sealing rims being in the uncompressed non-sealing position when adjacent said reduced diameter portion and in the compressed sealing position when adjacent said shoulder where said inner sealing rim sealingly engages said piston and said outer sealing rim sealingly engages said cylinder.

24. The apparatus of claim 22 wherein said leak detection means includes means for comparing the fluid pressure between said piston and said cylinder and the fluid pressure in the annulus of said cylinder and piston between said first and second sealer whereby a differentiation pressure indicates the establishment of a seal between said piston and cylinder.

25. The apparatus of claim 24 wherein said leak detection means includes an expansible conduit extending from the bottom of said cylinder to said annulus whereby said conduit expands upon movement of said piston.

26. The apparatus of claim 25 further including guide means for preventing the rotation of said piston around said cylinder.

27. The apparatus of claim 26 wherein said guide means includes an eye disposed on the interior of said cylinder and a pin projecting from said piston and received by said eye whereby said pin rises in said eye upon movement of said piston to prevent rotation of said piston.

28. The apparatus of claim 10 further including guide means on said piston for guiding the movement of said piston within said conduit.

29. The apparatus of claim 28 wherein said guide means includes a plurality of projections extending between said piston and said conduit.

30. The apparatus of claim 10 further including inlet means through which the fluid flows into said cylinder for directing the fluid to the top of said cylinder.

31. The apparatus of claim 29 wherein said inlet means includes an inlet conduit passing through an aperture in the bottom of said cylinder and extending to a position adjacent said piston in said contracted position.

32. The apparatus of claim 31 wherein the end of said inlet conduit adjacent said piston includes a plurality of azimuthally spaced apertures through which the fluid flows thereby directing fluid flow away from said piston.

33. The apparatus of claim 10 further including air escape means for permitting air trapped in said cylinder to escape as fluid fills said cylinder.

34. The apparatus of claim 32 further including air escape means having a tube passing through an aperture in the bottom of said cylinder and extending into a groove in said piston when said piston is in said contracted postion.

35. The apparatus of claim 34 wherein said tube passes through said inlet conduit.

36. The apparatus of claim 10 further including stop means for stopping the mvoement of said piston at a predetermined distance.

37. The apparatus of claim 36 wherein said stop means includes bumpers mounted on the interior of said conduit.

38. The apparatus of claim 10 wherein said first passage includes a plurality of ports extending through said cylinder.

39. The apparatus of claim 38 wherein said blocking means includes plug means for sealingly engaging the interior of said cylinder around said ports.

40. The apparatus of claim 39 wherein said plug means includes first seal means sealing around said cylinder above said ports and second seal means sealing around said cylinder below said ports.

41. The apparatus of claim 40 wherein said first seal means includes first upper and lower seal rings mounted on said plug means and said second seal means includes second upper and lower seal rings mounted on said plug means.

42. The apparatus of claim 41 further including leak detection means for detecting the leakage of fluid through said first passage upon engagement of said blocking means.

43. The apparatus of claim 42 wherein said leak detection means includes first means for determining the fluid pressure between said first upper seal ring and said first lower seal ring, second means for determining the fluid pressure between said second upper seal ring and said second lower seal ring, and third means for determining the pressure between said piston and said conduit whereby a positive pressure differential between said first and second means and said third means indicates sealing engagement.

44. The apparatus of claim 39 wherein said plug means includes a plug having a frustoconical sealing surface for sealingly engaging a frustoconical seat at the bottom of said cylinder and through which said ports extend.

45. The apparatus of claim 39 wherein said plug means includes a plug having a hub and a collar with circumferentially spaced webs extending between said hub and said collar.

46. The apparatus of claim 45 further including actuator means for moving said plug into sealing engagement with said cylinder.

47. The apparatus of claim 46 wherein said actuator means includes a rod affixed to said hub and extending through the bottom of said cylinder into an actuator cylinder, said rod having an actuator piston disposed within said actuator cylinder whereby upon application of hydraulic pressure said actuator piston reciprocates within said actuator cylinder to move said plug into sealing engagement with said cylinder.

48. The apparatus of claim 10 wherein said conduit includes a first end-plate having a fluid inlet therein and a second end-plate having a fluid outlet therein, said cylinder being mounted at one end to said first end-plate with the other end of said cylinder being open, said piston having a cylinder-like body with a plate closing one end, the other open end of said piston receiving the open end of said cylinder.

49. The apparatus of claim 10 further including extension means mounted on said piston and extending into an actuator cylinder, said extension means having an actuator piston disposed within said actuator cylinder whereby upon application of hydraulic pressure said actuator piston reciprocates within said actuator cylinder to move said piston to said contracted position.

50. The apparatus of claim 10 wherein said detector means includes an extension of said piston, a first and second indicator means disposed on said extension and a single detector for detecting said first indicator means at the beginning of the measuring and for detecting said second detector means at the end of the measuring.

51. The apparatus of claim 50 wherein said first and second indicator means are magnetic stripes on said extension and said single detector is a magnetic detector.

52. The apparatus of claim 50 wherein said first and second indicator means are marks on said extension and said single detector is a pointer.

53. A method of establishing a meter K-factor comprising the steps of:
flowing fluid through a flowmeter and generating pulses from the flowmeter;
flowing the fluid from the flowmeter through the inlet of a cylinder and out of the cylinder through an outlet in the cylinder;
closing the outlet in the cylinder;
moving a barrier to fluid flow on the cylinder in synchrony with the fluid flow into the inlet of the cylinder;
generating graduations in synchrony with the movement of the barrier;
providing a meter pulse counter for counting pulses generated by the flowmeter;
enabling the meter pulse counter to count flowmeter pulses in response to an indicator on the barrier activating a detector on the cylinder;
activating the graduation counter upon the meter pulse counter counting a pulse after the enabling of the meter pulse counter;
counting of both graduations and pulses simultaneously by the graduation counter and meter pulse counter; and
disabling the graduation counter after sufficient fluid has flowed through the cylinder to cause the graduation counter to count a minimum of 10,000 graduations.

54. A method for calibrating a flowmeter comprising the steps of:
flowing fluid from the flowmeter through the inlet of a cylinder mounted within a conduit, out of the cylinder through an outlet in the cylinder, and out of the conduit through an outlet in the conduit;
closing the outlet to fluid flow in the cylinder;
moving a barrier to fluid flow on the cylinder in synchrony with the fluid flow into the inlet of the cylinder;
generating graduations in synchrony with the movement of the barrier;
closing the outlet of the conduit and stopping the movement of the barrier;
activating a counter for counting the graduations;
opening the outlet of the conduit and directing the fluid into a certified container;
counting the graduations as the barrier moves in synchrony with fluid flow;
closing the outlet of the conduit upon a predetermined movement of the barrier and deactivating the counter; and
recording the number of graduations counted by the counter and the fluid volume collected in the certified container.

55. A meter prover for calibrating a flowmeter, comprising:
   a conduit in flow communication with the flowmeter;
   expansible chamber means in said conduit for measuring a precise volume of fluid;
   first indicator means mounted on said expansible chamber for indicating the beginning of the measurement of said volume;
   second indicator means mounted on said expansible chamber for indicating the end of the measurement of said volume; and
   a single detector, mounted on said conduit, activated by said first indicator means and deactivated by said second indicator means for defining said precise volume of fluid in said chamber means.

56. A meter prover according to claim 55, wherein the flowmeter includes means for generating an output signal having cycles proportional to a volume of fluid passing through the flowmeter, and wherein said meter prover further comprises:
   means for generating an output signal having cycles proportional to volume of fluid flowing into said expansible chamber means; and
   means for comparing said flowmeter output signal with said chamber means output signal and proving therefrom the flowmeter.

57. A meter prover according to claim 56 wherein said comparing means comprises:
   a first means for counting cycles of said flowmeter output signal; and
   a second means for counting cycles of said chamber output signal during a predetermined number of counts on said first counting means, whereby the predetermined number of counts of said first counting means and the number of counts of said second counting means may be used to calculate a K-factor for the flowmeter.

* * * * *